United States Patent Office 3,402,453
Patented Sept. 24, 1968

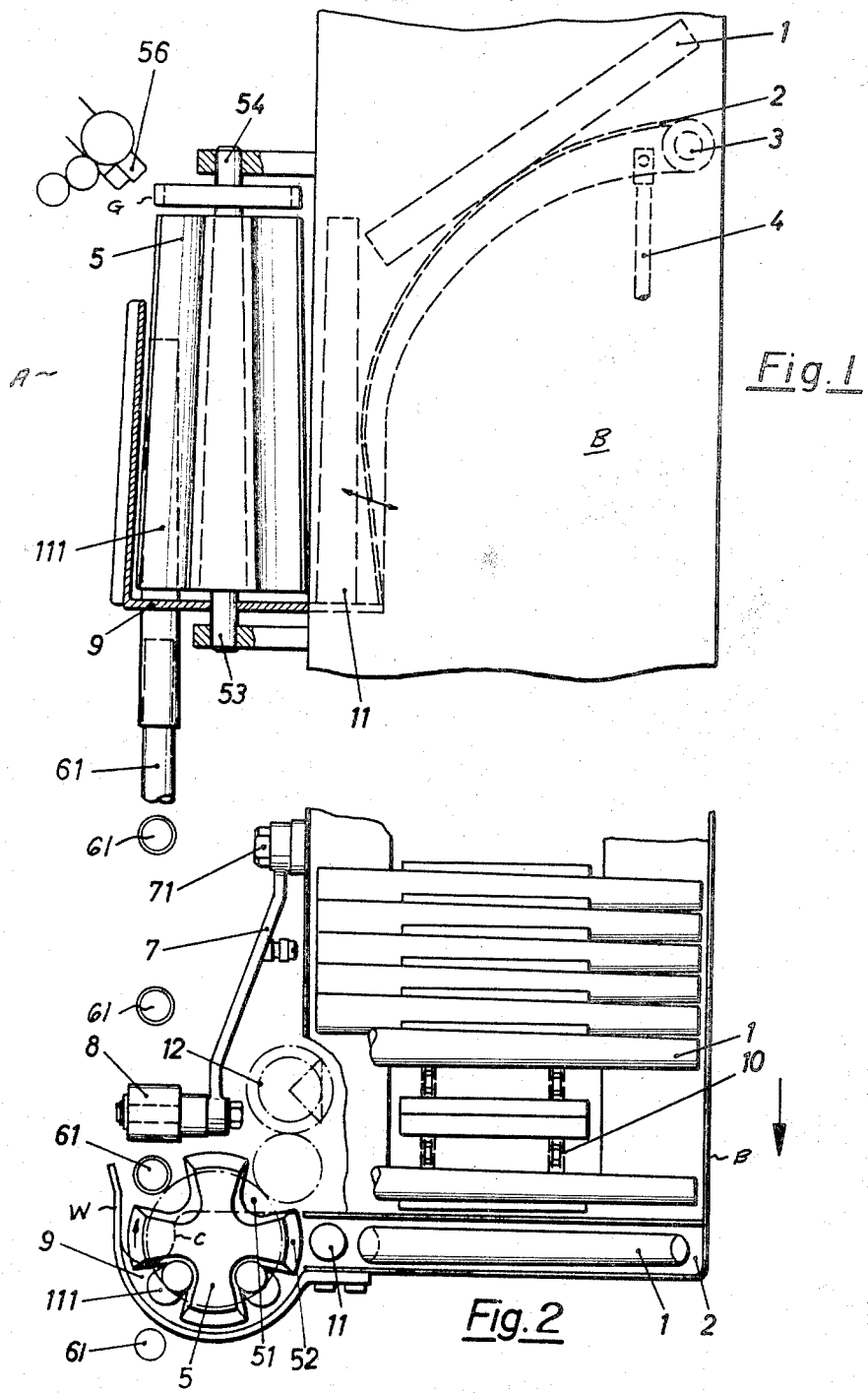

3,402,453
TUBE ASSEMBLING MEANS
Eberhard Grimm, Ingolstadt, Germany, assignor to Deutscher Spinnereimaschinenbau Ingolstadt, Ingolstadt (Danube), Germany, a corporation of Germany
Filed Nov. 29, 1965, Ser. No. 510,283
Claims priority, application Germany, Dec. 1, 1964, D 45,958
10 Claims. (Cl. 29—208)

ABSTRACT OF THE DISCLOSURE

Apparatus for assembling tubes, including sprocket-carrying means, adapted to transport a tube along a curved path and gravity discharge means whereby the tube is deposited on a spindle after having traveled about the curved path. The tube referred to is an elongated, tapered tube.

This invention relates in general to apparatus for handling tubular articles, and more particularly to an apparatus for placing tubes upon spindles which is particularly adapted for the continuous placing-on of empty tubes on ring-spinning and ring-twisting machines of the type used in spinning mills.

While the invention is susceptible of numerous potential applications, it is primarily directed to the feeding and placing-on of empty tubes during the continuous travel of the carriage of a cops-changing device on a ring-spinning or ring-twisting machine. In accordance with the invention, this is accomplished by an apparatus having a tube magazine arranged laterally at the lower end of a tube feed chute which is swingable about a yarn package and extends to above the spindle, with a pressing roller being placed behind the tube magazine and arranged on a vertically movable swinging arm. Instead of a swingable tube magazine, a tube magazine which is rigidly connected with the carriage and the front part of which is connected with a slide for displacement therewith can also be used. In addition, the invention features a pusher mechanism which serves to transfer the tubes out of the chute into the tube magazine.

The invention makes it possible to place individual empty tubes on the spindle during the continuous travel of the cops-changing machine by a corresponding movement of the tube magazine so that the relative movement with respect to the spindle is zero during the tube placing-on operation.

While the over-all movement of the tubes in the magazine is equivalent to that of a prior art reciprocating type tube placing apparatus, the invention provides a rotary tube magazine which avoids some of the problems associated with the operation of the reciprocating tube placing machines.

In a reciprocating tube placing apparatus, only a very short period of time is available for the counter-motion of the tube magazine or carrier in order in each case to return to its starting point and in this connection to move in advance of the movement of the carriage to the next spindle. Furthermore, the continuous rapid reversal of the direction of movement, particularly with the high operating speeds and small spindle spacings, has a kinematrically unfavorable effect upon the drive of the tube magazine or carrier. It is therefore, desirable to provide a tube placing apparatus wherein the tube magazine does not change its direction of movement in order to place a tube upon each of a succession of spindles.

In ring-spinning machines with drawing mechanisms that extend to above spindles, it is not possible to move the tubes with the tube magazine vertically above the spindles in order to feed the empty tubes onto them.

Therefore, another object of the invention is to find a method of operation which makes the placing-on of the tubes possible even in cases of ring-spinning machines having a drawing mechanism which extends far forward.

It is furthermore, one of the objectives of the invention to provide a tube feeding mechanism for supplying tubes to the magazine via a slide chute which is so constructed and arranged that there is no catching of the tubes on one another, or jamming within the tube feed mechanism itself or between tubes in transit through the tube feed mechanism and other tubes in ready positions in the magazine. In some prior art tube feeding mechanisms, it was possible that tubes sliding down on the chute could catch on the outer grooves of a tube which was in the ready position with the result being that the tube feeding operation would become jammed since the tubes would come to rest on the slide chute instead of being pushed into the tube magazine.

The objectives of the invention are attained by using an apparatus having a drum-like tube magazine which is rotatable about a vertical axis and which can be driven continuously in synchronous relation to the passage of underlying spindles to provide for the placement of tubes thereupon under conditions where no relative movement between the spindles and magazine occurs. In accordance with the invention, the rotary drum tube magazine can be of either cylindrical or conical development.

Jamming of the tubes is avoided in accordance with the invention by using a tube slide chute which can simultaneously serve as a pusher to introduce the tubes into the magazine, and for such purpose, the chute is swingable in elevation about an upper pivot connection point.

It is therefore, an object of the invention to provide an apparatus for the placement of tubes upon spindles.

Another object of the invention is to provide an apparatus as aforesaid which is continuously operable in synchronism with a moving train of spindles to place a tube upon each spindle thereof in succession.

A further object of the invention is to provide an apparatus as aforesaid wherein the placement of tubes upon the spindles can be accomplished by gravity depositing of the tubes from an overlying magazine.

A further object of the invention is to provide an apparatus as aforesaid which features a reliable tube feeding means for continuously supplying tubes to the magazine without jamming or catching of the tubes on one another.

A further object of the invention is to provide an apparatus as aforesaid wherein the transfer of tubes from the tube feeding means to the magazine, and the placing of the tubes on spindles thereby is accomplished by continuous uni-directional motion rather than by reciprocating motion.

Still another and further object of the invention is to provide an apparatus as aforesaid which is adaptable for use with ring-spinning machines having a drawing mechanism which extends far forward.

Other and further objects and advantages of the invention will become apparent from the following detailed description and accompanying drawing in which:

FIG. 1 is a schematic elevation view, partly in section, of a tube placing apparatus according to a preferred embodiment of the invention.

FIG. 2 is a schematic plan view of the appartus of FIG. 1.

Referring now to FIGS. 1 and 2, tubes 1 which have been pre-sorted by a conveyor chain 10 are fed to the tube placing apparatus A for placement thereby upon spindles 61. The tubes 1 are in this connection thrown onto a tube chute 2 which is swingable in elevation about its pivot connection 3 to a base means B, such as the support frame for the conveyor chain 10. Swinging of the tube chute 2 is effected by a push-pull rod 4 which is expediently pivot connected to the chute 2, and is driven by any conventional drive means (not shown) which will effect the intended swinging movement of the chute 2 thereby back and forth in the direction indicated by the arrow in FIG. 2. By this swinging movement of the tube chute 2, the tube 1 slides down on the chute and assumes the position indicated by the tube 11. The tube 11 is fed to a star-shaped tube holder, or sprocket drum magazine 5 and is pushed against the smooth outer surface 52 of the drum magazine 5 until an empty chamber 51 defined by a sprocket indentation thereof receives the tube 11 and conveys it toward the spindle 61.

The drum magazine is rotated in the direction indicated by the arrow in FIG. 1 until the tube 11, which is designated as 111 in the chamber 51, has arrived above a cut-out portion C provided in the bottom plate 9. At this position, the chamber 51 containing the tube 111 is in an overlying position with respect to the spindle 61 so that the tube 111 is deposited by gravity onto said spindle 61.

For the pressing-on of the tubes 111 which are loosely seated on the spindles 61, an elastic roller 8 is provided on a lever 7 which is rotatably mounted to the base means B by a pivot pin 71.

As can be noted from FIG. 2, the tube magazine 5 is rotatably supported at the points 53 and 54 and is adapted to be driven continuously in rotation by a drive means 12 which can be expediently coupled thereto via a gear G.

In order to adapt the effective pitch or spacing of the tubes 111 in the magazine 5 to the specific spacing of the spindles 61 moving on a train carrier (not shown), the drive 12 can be regulated in synchronism with the movement of the spindle 61 train by any conventional means, such as for example an intermittent drive mechanism (not shown) or a step-by-step gearing (not shown) included within the drive means 12.

A variety of replaceable tube magazines 5, each having a different chamber 51 spacing arrangement, can also be used to accommodate corresponding spindle 61 train speeds with a drive means 12 that provides a given fixed magazine 5 rotation speed.

As better illustrated by FIG. 2, a conically developed tube magazine 5 permits the free fall placing-on of tubes 111 upon spindles 61 even in the case of ring-spinning machines (not shown) having protruding drafting mechanisms exemplified by the drafting mechanism 56.

As can be appreciated by the artisan from the foregoing description, the apparatus A essentially comprises a sprocket drum magazine 5 disposed for rotation about a substantially vertical axis to receive a tube 11 from a tube feeding means, such as the swingable chute 2, at a first offset axial position, i.e. where the chamber 51 lines up with the chute 2, and to convey said tube (indicated as 111) in a sprocket indentation defined chamber 51 to a second offset axial position, i.e. that of the bottom plate 9 cut out C, aligned with an underlying spindle 61. At this second position, the 111 is deposited by gravity onto the spindle 61.

To prevent unintended dropping of the tube 111 during its conveyance by the drum magazine 5 between the point at which it is fed by the chute 2 into a chamber 51, and the point at which it is deposited onto the spindle 61, the invention provides a means for retaining the tube 111 in operative engagement with the chamber 51 for conveyance thereby into the spindle 61 drop-on position, and such retaining means, as defined by a curved guide wall W and the bottom plate 9 with its cut-out C, is arranged so that said tube 111 is released from engagement with the chamber 51 at the position overlying the spindle 61.

It should be noted that the invention is not necessarily restricted to a mode of operation wherein only one tube 111 is deposited upon a single spindle 61, and accordingly, the apparatus A can be operated so that two or more tubes 111 are deposited on a single spindle 61.

However, in the normal contemplated operation of the apparatus A, the spindles 61 are conveyed in a train along a path underlying the tube 111 dropping position of the drum magazine 5, so that by rotating the drum magazine in synchronous relation to the passage of the spindles 61 the tubes 111 carried by successive sprocket indentation chambers 51 are deposited upon corresponding successive spindles passing in coincident underlying relation to the dropping position of the drum magazine 5.

As better illustrated in FIG. 2, the tube chute 2 is disposed for pivotal movement in elevation relative to the drum magazine 5 and is so curved that when said tube chute 2 is swung upward by the push-pull rod 4, a tube, such as the tube 11 resting upon the bottom plate 9 is pushed into a chamber 51 when same is lined up radially with the chute 2.

It should be noted that the retaining means which is defined by the guide wall W and the bottom plate 9 is so arranged as to permit the tubes 111 to be retained in engagement with the drum magazine 5 until they arrive at the drop out position thereof. For this purpose, the guide wall W is disposed in partially encompassing relation to the drum magazine 5 and the bottom plate 9 is disposed in underlying relation thereto with its cut-away portion C being disposed to permit tubes 111 conveyed by the drum magazine 5 to fall freely therethrough onto an underlying spindle 61 upon arrival at the drum magazine drop-out position.

To provide for a more firmly seated engagement of tubes 111 deposited onto spindles 61, the apparatus A includes a tube pressing means disposed for operative engagement with such tubes 111 deposited on the spindles 61 for pressing them down thereupon into positions of firmly seated engagement therewith. This tube pressing means includes an arm member 7 disposed for pivotal movement in a substantially vertical plane, and a roller member 8 operatively connected to the arm member 7 and disposed for operative engagement with tubes 111 deposited on the spindles 61 when said spindles 61 are under the drum magazine 5 drop-out position, so that such tubes 111 can be pressed firmly onto their respectively associated spindles 61 by the downward pivotal movement of the arm member 7.

What is claimed is:

1. An apparatus for assembling a tube upon a spindle which comprises a sprocket drum magazine disposed for rotation about a substantially vertical axis to receive an elongated, tapered tube from a feeding means for an elongated, tapered tube at a first offset axial position and to convey said tube in a sprocket indentation to a second offset axial position aligned with an underlying spindle, and at said second position to deposit said elongated, tapered tube upon said spindle, and means for retaining said elongated, tapered tube in operative engagement with said sprocket indentation for the conveyance of said elongated, tapered tube from said first to said second position, said retaining means being disposed to release said elongated, tapered tube from engagement with the sprocket indentation at said second position to permit said tube to be deposited on the spindle by gravity.

2. The apparatus according to claim 1 wherein said sprocket drum magazine is conically developed.

3. The apparatus according to claim 1 wherein said retaining means is defined by a guide wall disposed in partially encompassing relation to the drum magazine and a bottom plate disposed in underlying relation thereto, said bottom plate having a cut-away portion disposed to permit tubes conveyed by the drum magazine to fall freely therethrough onto an underlying spindle upon arrival at said second position.

4. The apparatus according to claim 1 including a tube feeding means disposed to elongated tapered feed tubes in succession into drum magazine sprocket indentations positioned successively at said first position by continuous rotation of the sprocket drum magazine to convey said tubes in succession to said second position and to deposit them thereat upon the underlying spindle.

5. The apparatus according to claim 4 wherein said feeding means for elongated, tapered tubes includes a tube chute disposed for guiding said elongated, tapered tubes into drum magazine sprocket indentations positioned successively at said first position by rotation of said drum magazine.

6. The apparatus according to claim 5 wherein said chute for elongated tapered tubes is disposed for pivotal movement in elevation relative to said drum magazine to push said tubes, one at a time, into operative engagement with successive sprocket indentations of said drum magazine for conveyance thereby to said second position.

7. The apparatus according to claim 1 including a tube feeding means disposed to feed elongated, tapered tubes in succession into drum magazine sprocket indentations positioned successively at said first position by continuous rotation of the sprocket drum magazine to convey said tubes in succession to said second position and to deposit them thereat, one at a time, upon spindles passed in coincident underlying relation to said second position.

8. The apparatus according to claim 7 including drive means operatively connected to said drum magazine for rotating same in synchronous relation to the passage of the spindles to deposit elongated, tapered tubes carried by successive sprocket indentations of said drum magazine upon corresponding successive spindles passing in coincident underlying relation to said second position.

9. The apparatus according to claim 1 including pressing means for elongated, tapered tubes disposed for operative engagement with an elongated, tapered tube deposited on said spindle for pressing said tube into a position of firmly seated engagement therewith.

10. The apparatus according to claim 9 wherein said pressing means for elongated, tapered tubes includes an arm member disposed for pivotal movement in a substantially vertical plane, and a roller member operatively connected to said arm member and disposed for operative engagement with an elongated, tapered tube deposited on said spindle to press said tube firmly onto said spindle in response to the downward pivotal movement of said arm member.

References Cited

UNITED STATES PATENTS

| | | | |
|---|---|---|---|
| 1,941,992 | 1/1934 | Makenny | 29—208 X |
| 2,729,833 | 1/1956 | Nielsen | 29—208 X |
| 3,108,363 | 10/1963 | Haumiller | 29—208 |

THOMAS H. EAGER, *Primary Examiner.*